United States Patent [19]
Toyohara

[11] Patent Number: 5,923,795
[45] Date of Patent: *Jul. 13, 1999

[54] OPTICAL WAVEGUIDE DEVICE HAVING A DOUBLE-REFRACTOR AT AN INPUT THEREOF

[75] Inventor: Atsushi Toyohara, Tokyo, Japan

[73] Assignee: NEC Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/724,249

[22] Filed: Sep. 30, 1996

[30] Foreign Application Priority Data

Sep. 29, 1995 [JP] Japan ................................ 7-252137

[51] Int. Cl.$^6$ .............................. G02B 6/26; G02F 1/295
[52] U.S. Cl. .................................. 385/11; 385/8; 385/28; 385/29; 385/49
[58] Field of Search ................................ 385/1, 2, 8, 11, 385/18, 22, 28, 29, 49–50, 39

[56] References Cited

U.S. PATENT DOCUMENTS

| | | | |
|---|---|---|---|
| 5,037,205 | 8/1991 | Pavlath | 385/14 |
| 5,259,044 | 11/1993 | Isono et al. | 395/2 |
| 5,483,609 | 1/1996 | Nakaya | 385/11 |
| 5,499,307 | 3/1996 | Iwatsuka | 385/11 |
| 5,611,004 | 3/1997 | Chang et al. | 385/11 |

FOREIGN PATENT DOCUMENTS 62-251728  4/1988  Japan .
3-198412   8/1991  Japan .
4112208    1/1992  Japan .

OTHER PUBLICATIONS

N. Goto et al.; "A TE–TM Mode Splitter in LiNbO$_3$ by Proton Exchange and Ti Diffusion"; Journal of Lightwave Technology, vol. 7, No. 10, Oct. 1989, pp. 1567–1574.

A. Neyer; "Low–crosstalk passive polarization splitters using Ti:LiNbO$_3$ wave–guide crossings"; Appl. Phys. Lett. 55(10), Sep. 4, 1989; pp. 927–929.

*Primary Examiner*—Hemang Sanghavi
*Attorney, Agent, or Firm*—Whitham, Curtis & Whitham

[57] ABSTRACT

An optical waveguide device comprises: a waveguide substrate with a waveguide created therein; optical fibers optically linked to the waveguide at both end surfaces of the waveguide; and a double-refraction means provided at the one end surface for splitting an incident light into normal and abnormal lights. A rutile plate stuck to an end surface of the waveguide is used as an actual double-refraction means for arbitrarily selecting an incident light hitting the waveguide and splitting the incident light into normal and abnormal components. By providing rutile plate having a double-refraction effect such as the rutile plate on the end surface of the waveguide, a difference in phase between optical paths is resulted in due to polarization of the incident light, making separation into TE and TM modes possible. By optically linking lights split and radiated in the rutile plate to the incident end surface of the waveguide, any arbitrary polarization light can be applied to the waveguide.

26 Claims, 5 Drawing Sheets

A-A' CROSS SECTION

DISTRIBUTION OF AN ELECTRIC FIELD CAUSED BY AN APPLIED VOLTAGE

OPTICAL WAVEGUIDE DEVICE HAVING A DOUBLE-REFRACTOR AT AN INPUT THEREOF

BACKGROUND OF THE INVENTION

1. Field of the Invention

The present invention relates in general to an optical waveguide device and in particular to an optical device that requires the use of an optical waveguide modulator and a polarizing filter for separating a polarization light.

2. Description of Related Art

In the case of an optical waveguide device using a substrate having an electro-optical effect, a portion having a high index of refraction is created in the substrate. In addition, electrodes between which a voltage is applied are created above the wave guide or in close proximity to it. A voltage applied between the electrodes generates an electric field in the substrate, changing the index of refraction of a waveguide. Variations in index of refraction occurring in the waveguide in turn modulate the phase and intensity of a light or switch the path of the light.

First of all, the following description briefly explains the structure and operation of a light-intensity modulating device that utilizes an electro-optical effect closely related to the present invention as an example of an optical waveguide device. In addition, a technology for separating a polarization light is also described briefly as well.

In general, a niobium-acid lithium substrate having a relatively high electro-optical effect among strong dielectrical materials is used as the substrate of the optical waveguide device. In the optical waveguide device using a niobium-acid lithium substrate, a titanium film created on the substrate undergoes a patterning process to form a waveguide pattern. Later on, a wave guide is formed by thermal diffusion for several hours at a high temperature of about 1,000 degrees Celsius. A silicon dioxide buffer film layer which is referred to hereafter as an $SiO_2$ film is created on the wave guide. Electrodes each made of a metallic film are further created on the $SiO_2$ film. In some cases, a silicon film which is referred to hereafter as an Si film is created between the SiO2 film and the metallic film.

In the optical waveguide device, it is possible to integrate a function for modulating a light and a function for switching the path of a light on the substrate. In addition, since these functions are high-speed functions, development of the optical waveguide device as an external modulator used in mass optical communication and an optical-path switch employed in an OTDR (Optical Time Domain Reflectometer) is under way.

Depending upon the application of the optical waveguide device, a polarization-light independent type and a low driving voltage type are demanded. It is important that the polarization-light independent type be used in an optical-path switch of an OTDR. On the other hand, it is important that the low driving voltage type can be used for a high-speed optical modulator.

Normally, in an optical waveguide device of the latter type, either a TE mode (that is, a mode in which the electric field component of a waveguide light is parallel to the substrate) or a TM mode (that is, a mode in which the magnetic field component is parallel to the substrate) is selected in order to reduce the driving voltage. When a niobium-acid lithium Z-cut substrate is used, a waveguide light of the TM mode with a driving voltage of about one-third of that of the TE mode is used.

When only one polarization wave is to be applied to the optical waveguide device, or when a polarization wave is to be split into components which are then each applied to the optical waveguide device, it is necessary to increase the polarization-wave quenching ratio (that is, a ratio of a TE component to a TM component) of the light source. In addition, it is also necessary to provide a polarization maintain fiber, which is referred to hereafter as a PMF, for optically connecting the light source to the end surface of a waveguide and, at the same time, to also sustain the main axis of the PMF in a stable state in directions perpendicular and parallel to the waveguide.

In the case of such a configuration, it is theoretically possible to apply only a predetermined polarization component to the waveguide. Because of angle adjustment of the main axis, fiber related factors, or factors external to the fiber such as variations in temperature and a stress applied to the fiber, however, it is quite within the bounds of possibility that the polarization-wave quenching ratio deteriorates. The deterioration of the polarization-wave quenching ratio in turn gives rise to distortion of the modulated waveform, degrading the transmission quality.

In addition, the three conventional polarization-light separating technologies described previously require a special structure of the waveguide and special processes for manufacturing the waveguide in order to obtain the necessary functions. As a result, the conventional optical waveguide device has problems that elements constituting the waveguide increase in size while the structure of the waveguide becomes complex and, on the top of that, the number of manufacturing processes increases and it becomes difficult to maintain a high manufacturing yield.

SUMMARY OF THE INVENTION

It is an object of the present invention to provide a compact and easily producible optical waveguide device that has a function to split an incident light into optical components in accordance with the state of polarization and to lead the optical components to a waveguide.

The optical waveguide device provided by the present invention comprises a waveguide substrate having a waveguide formed therein and an optical fiber which is provided at the end surface of the waveguide and optically connected to the waveguide. In addition, the optical waveguide device provided by the present invention also has a double refraction index means for splitting an incident light hitting the end surface of the waveguide into a normal light and an abnormal light.

The double refraction index means for arbitrarily selecting and splitting an incident polarization wave hitting the waveguide is typically implemented as a rutile plate stuck to the end surface of the waveguide.

Since the rutile plate exhibits a double-refraction effect, the optical path varies depending upon the incident polarization light. Thus, separation of the TE and TM modes is possible. It is possible to apply any arbitrary polarization light to the waveguide by optically linking the incident end surface of the waveguide to a light separated and radiated in the rutile plate stuck to the incident end surface of the waveguide.

The separation distance from one polarization light to another (d) is approximately equal to one-tenth of the thickness (t) of the rutile plate. Therefore, by appropriately selecting the value of thickness, the distance can be adjusted.

BRIEF DESCRIPTION OF THE DRAWINGS

The above and other objects, features and advantages of the present invention will become more apparent from the following detailed description of some preferred embodiments with reference to accompanying drawings showing the embodiments wherein:

FIG. 2A is a diagram showing a state with no voltage applied;

FIG. 2B is a diagram showing a state with a voltage applied;

FIG. 3A is a diagram for a light of a TM mode;

FIG. 3B is a diagram for a light of the TM mode and a TE mode;

DETAILED DESCRIPTION OF THE PREFERRED EMBODIMENTS

First of all, a conventional optical waveguide device is explained before describing an optical waveguide device provided by the present invention in order to understand the optical waveguide device provided by the present invention with ease.

Figure 1:
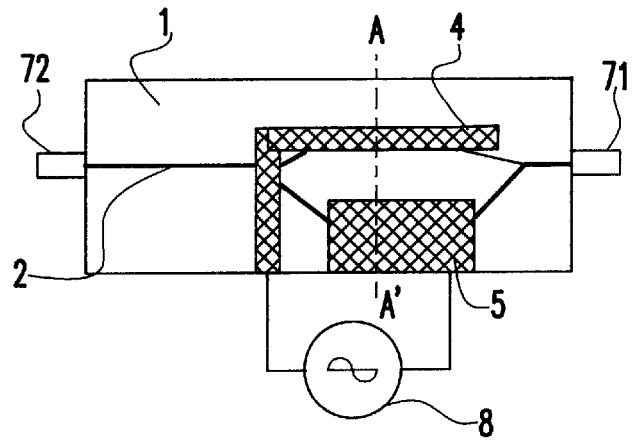
FIG. 1 is a diagram showing an upper view of the configuration of a conventional Mach-Zehnder light modulating device.

FIG. 1 is a diagram showing an upper view of the configuration of a typical Mach-Zehnder light modulating device. The research and development of such a light modulating device have been extensively carried out from the past in addition to studies to put it to practical use. The structure and principle of operations of the light modulating device are explained by referring to this figure.

Figure 2A:
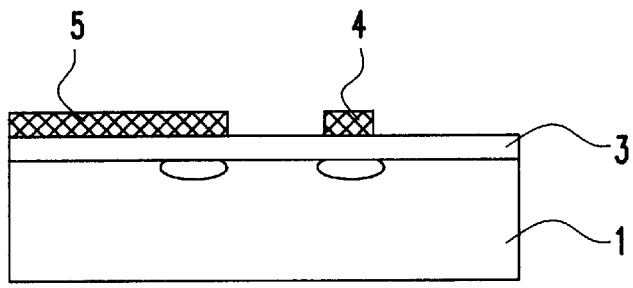
FIGS. 2A–2B are diagrams showing a cross section of the configuration of the conventional Mach-Zehnder light modulating device.

A waveguide 2 created on a niobium-acid lithium substrate 1 is a Mach-Zehnder optical interference device comprising two branch points and two parallel waveguides in the middle thereof. As shown in FIG. 2A, metallic layers made of typically chrome or gold are created on an SiO2 film 3 which is created on the entire surface of the waveguide substrate 1. The metallic layers serve as electrodes 4 and 5 above the two parallel waveguides 2.

An input-side optical fiber 71 and an output-side optical fiber 72 are optically linked and fixed to both end surfaces of the waveguide substrate 1 which has the waveguide 1 and the electrodes 4 and 5 as described above. An output pin of a driving circuit 9 is connected to the electrode 4. The driving circuit 9 applies a voltage signal to the electrode 4.

Figure 2B:
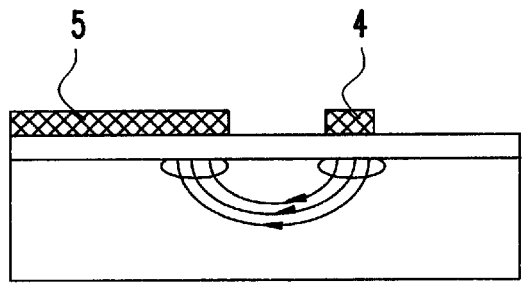

When an external voltage is applied to the electrodes 4 and 5, an electric field is generated in a vertical direction as indicated by arrows between the two parallel waveguides 2 created in the substrate as shown in FIG. 2B and the index of refraction of the waveguide 2 changes due to an electro-optical effect of the niobium-acid lithium.

Relations between the applied voltage and the optical output are shown in FIG. 3. With no voltage applied between the electrodes 4 and 5, the light is once split before being merged again. If the structures of the two arms, which are referred to hereafter as a pair of waveguides, in the Mach-Zehnder optical interference device are identical with each other, there is no difference in phase between the two split lights and the lights are output again with propagation loss and splitting loss eliminated. As the applied voltage is increased, however, the phases of the two split lights become different from each other. At a certain applied voltage, the difference in phase reaches 180 degrees. When such two split lights are merged again, the output of the light can not be observed any more due to interference. In a Mach-Zehnder light modulating device, a light is modulated by the presence and absence of an applied voltage as described above.

In general, a Mach-Zehnder light modulating device is operated by applying a modulating voltage having a magnitude in the range |Vh–Vl| where Vh and Vl are voltages at which the light output reaches a maximum and a minimum respectively. The modulating voltage also referred to as an operating voltage is denoted by a symbol Vπ. In addition, in order to carry out modulation with a high degree of efficiency, a bias voltage Vb is superposed on the modulating voltage Vπ. The magnitude of the bias voltage Vb is (Vh–Vl)/2.

Figure 3A:
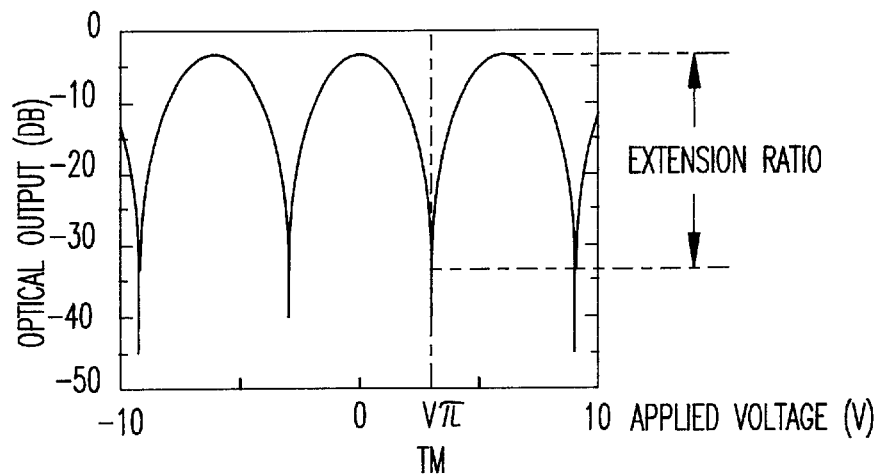
FIGS. 3A–3B are diagrams showing typical variations in modulated waveform caused by an incident polarization wave hitting the conventional Mach-Zehnder light modulating device.
Figure 3B:
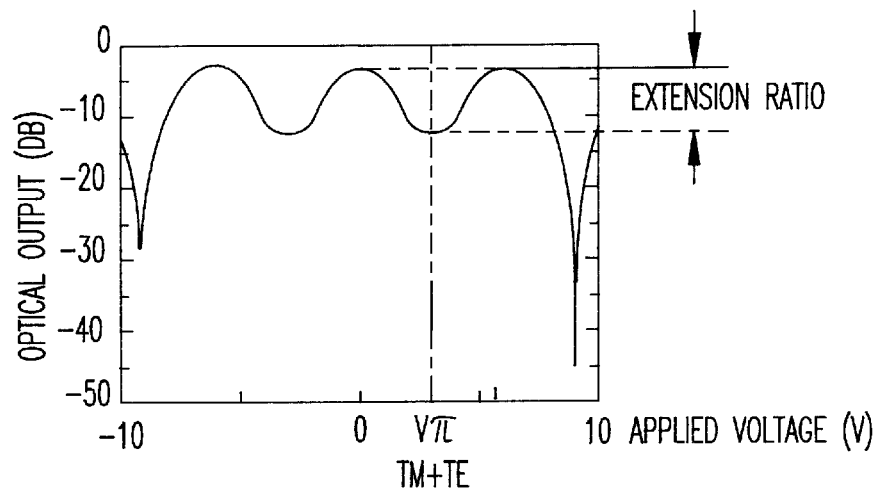
Figure 3C:
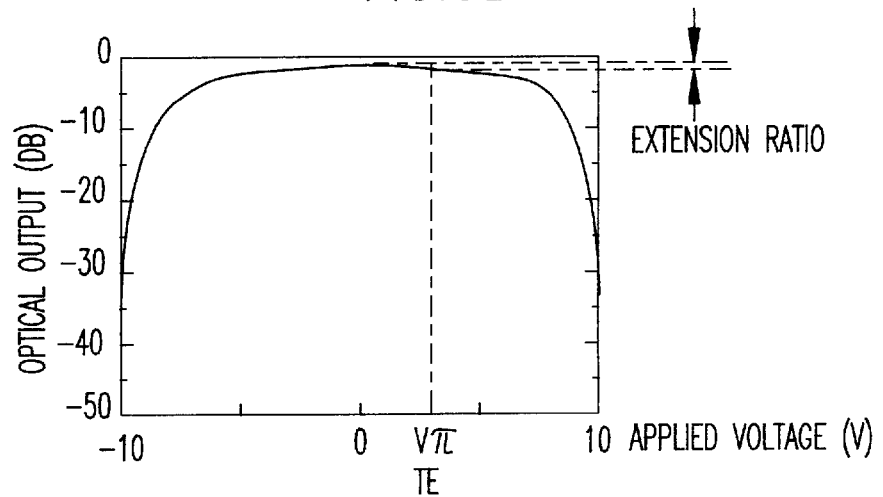
FIG. 3C is a diagram for a light of the TE mode.

Let the polarization wave of an incident light hitting the Mach-Zehnder light modulating device be changed in a TM mode only, a TM and TE mixed mode and a TE mode only. In this case, relations between the applied voltage and the light output are shown in FIGS. 3A, 3B and 3C for the TM mode, the TM and TE mixed mode and the TE mode respectively. As shown in FIGS. 3A and 3C, in the TM mode only, the polarization-wave quenching ratio reaches a peak at a voltage equal to one-third of the voltage required by the polarization-wave quenching ratio to reach the peak in the TE mode only. That is to say, in order to use a low driving voltage, adjustment is carried out so as to put the incident polarization light in the TM mode.

There are three types of waveguide device. In a waveguide device of the first type, an incident polarization light is selected as is the case with a niobium-acid lithium light modulating device while, in a waveguide device of the second type, the polarization light is split into components which then each undergo signal processing such as modulation. In a waveguide device of the third type, the polarization light is used without being split.

Methods adopting technologies for selecting a polarization light include a technique for adjusting an optical fiber described earlier and a technique of using a polarizer (LAMIPOL) on the incident surface of the waveguide path and attenuating only a certain specific polarization light.

Figure 4:
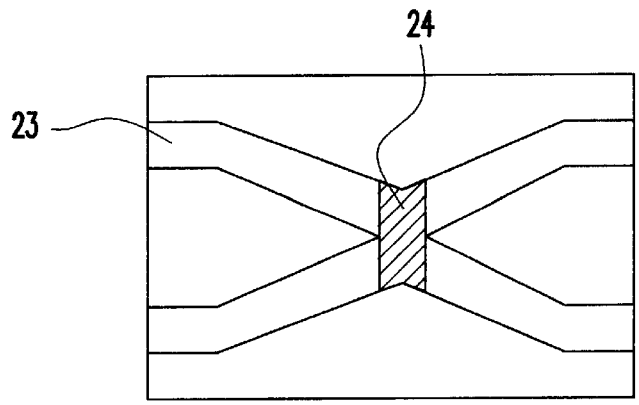
FIG. 4 is a plane diagram showing a polarization-light splitting device taken from reference document 1.

On the other hand, an example of a technology for splitting a polarization light is described as follows. FIG. 4 is a plane diagram showing a polarization-light splitting device taken from Appl. Phys. Lett. 55(20), pp 927–929, 1989 referred to hereafter as reference document 1. As shown in the figure, the polarization-light splitting device comprises an X branch-type titanium diffusion optical waveguide path 23 with a titanium film thickness of T1 and an X branch portion 24 with a titanium film thickness of (T1+T2) indicated by a hatched portion. At the X branch portion 24 with great variations in index of refraction, a high-order mode is excited to give rise to an effect of a kind of polarity coupler By properly setting the propagation length (which depends on the intersection angle) of the X branch portion 24, separation into TE and TM modes is possible.

Figure 5:
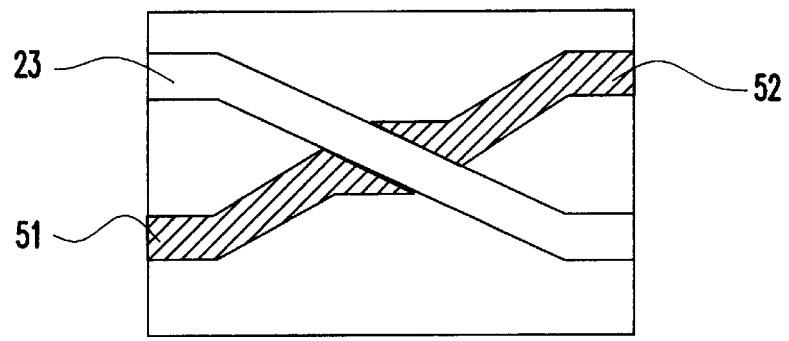
FIG. 5 is a plane diagram showing a polarization-light splitting device taken from reference document 2.

FIG. 5 is a plane diagram showing a polarization-light splitting device taken from Journal of Lightwave Technology Vol. 7, No. 10, pp 1567 to 1574, 1989 which is referred to hereafter as reference document 2. As shown in the figure, the polarization-light splitting device comprises a titanium diffusion optical waveguide 20 and an X branch waveguide which comprises proton exchange optical waveguides 51 and 52. In the region of the titanium diffusion optical waveguide which include the proton exchange optical waveguides having a taper shape, a high-order mode is excited. Due to a difference in effective index of refraction of the two types of waveguide split from each other at a later stage, the waveguide mode is separated, giving rise to an effect of a polarization-light separating device.

Figure 6:
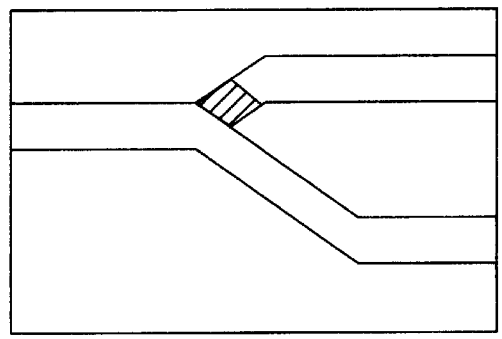
FIG. 6 is a plane diagram showing an example of a polarization-light splitting device taken from reference document 3.

FIG. 6 is a plane diagram showing a method of splitting a polarization light disclosed in Japanese Patent Laid-open No. Hei 4-11208. According to this method, at an Y branch portion of an Y branch titanium diffusion optical wave-guide path or at an X intersection of an X branch titanium diffusion optical waveguide, a proton exchange region is provided. The proton exchange region satisfies a total-reflection condition for only a polarization-light component in a direction either perpendicular or parallel to the substrate. When only a certain incident polarization wave hits the optical waveguide device, or when the polarization wave is split into incident components hitting the optical waveguide device, it is necessary to increase the polarization-wave quenching ratio (or the ratio of a TE component to a TM component) of the light source, to optically connect the light source and the end surface of the waveguide by means of an polarization maintain fiber (PMF) and to sustain the main axis of the PMF in a stable state in a direction perpendicular or parallel to the waveguide.

In the case of such a configuration, it is theoretically possible to apply only a predetermined polarization component to the waveguide. Because of angle adjustment of the main axis, fiber related factors, or factors external to the fiber such as variations in temperature and a stress applied to the fiber, however, it is quite within the bounds of possibility that the polarization-wave quenching ratio deteriorates. The deterioration of the polarization-wave quenching ratio in turn gives rise to distortion of the modulated waveform, degrading the transmission quality.

The configuration using a ramie pole as disclosed in Japanese Patent Laid-open No. 1351184 is not appropriate for a case in which separation of a polarization light is required because one of the split polarization light is greatly attenuated. In addition, the three conventional polarization-light separating technologies described earlier require a special structure of the waveguide and special processes for manufacturing the waveguide in order to obtain the necessary functions. As a result, the conventional optical waveguide device has problems that elements constituting the waveguide increase in size while the structure of the waveguide becomes complex and, on the top of that, the number of manufacturing processes increases and it becomes difficult to maintain a high manufacturing yield.

Next, an optical waveguide device provided by the present invention is described by referring to diagrams.

FIGS. 7A to 7D are diagrams showing optical waveguide devices provided by embodiments of the present invention. In the embodiments shown in FIG. 7, a waveguide 21 is created on the surface of a niobium-acid lithium substrate 1 by means of titanium thermal diffusion, much the same method used for the conventional optical waveguide device. Both the end surfaces of the niobium-acid lithium substrate 1 are each ground into a mirror-like surface in a grinding process. Optical fibers 71 and 72 are connected and fixed to end surfaces of the waveguide 21 in an optically adjusted state.

Figure 7A:
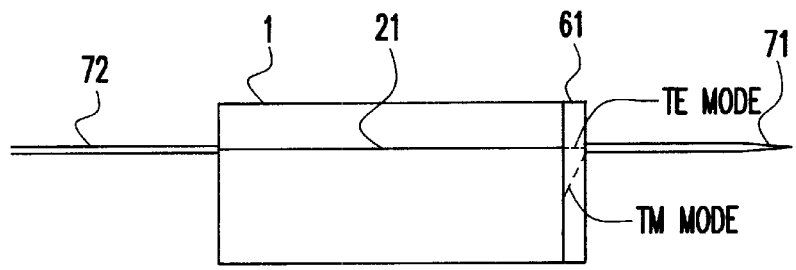
FIGS. 7A to 7D are diagrams showing optical waveguide devices provided by embodiments of the present invention.

As shown in FIG. 7A, a polarization-light splitting rutile plate 61 is inserted between the waveguide 21 and the optical fiber 71. As a polarization-light splitting rutile plate, a rutile plate having a double-refraction effect is employed. FIG. 7A is a diagram showing a method of applying an incident light to the waveguide 21 in a TE mode. A light radiated from the optical fiber 71 is split by the polarization-light splitting film 61 into normal and abnormal light components. The position of the optical fiber 71 is adjusted in advance so that only the light component having an electric-field direction parallel to the surface of the substrate is linked to the waveguide 21. Thus, only the light with the electric field direction thereof parallel to the surface of the substrate, that is, only the TE mode component of the light is linked to the waveguide 21.

Figure 7B:
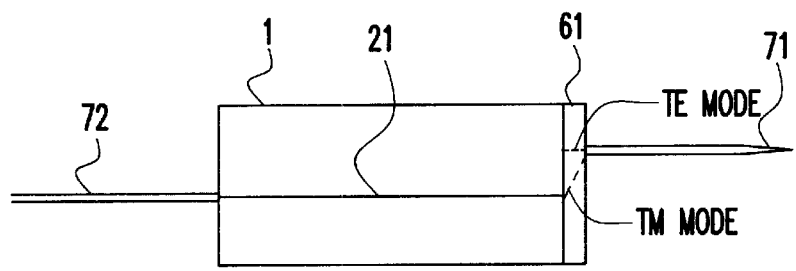

FIG. 7B is a diagram showing a method for applying a light to the waveguide 21 in the TM mode by inserting a polarization-light splitting rutile plate 61 between the waveguide 21 and the optical fiber 71. In contrast with the method shown in FIG. 7A, the optical fiber 71 is provided in such a way that only the light with the electric field direction thereof parallel to the surface of the substrate, that is, only the TM mode component of the light is linked to the waveguide 21.

Figure 7C:
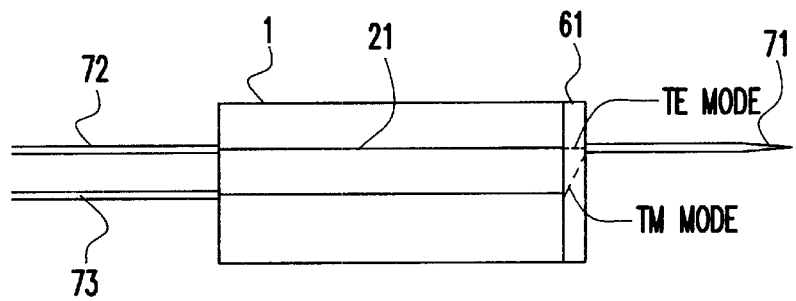
Figure 7D:
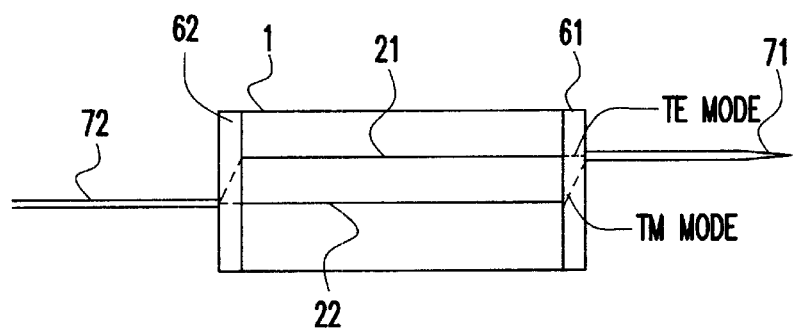

In addition, FIG. 7C is a diagram showing an embodiment wherein a polarization-light splitting rutile plate 61 is inserted between the waveguides 21 and 22 and the optical fiber 71 on the power supply side and incident lights enter the waveguides 21 and 22 in TE and TM modes respectively. Finally, FIG. 7D is a diagram showing an embodiment with an optical path up to the incidence of a light identical with that of the embodiment shown in FIG. 7C. In the case of the embodiment shown in FIG. 7D, however, outputs of the light once split at the incidence time are merged again by a polarization-light splitting rutile plate 62 inserted on the output side of the waveguides 21 and 22 and applied to the radiating optical fiber 72.

In the embodiments shown in FIGS. 7A to 7D, the thickness of the polarization-light splitting rutile plates 61 and 62 is 150 microns. Thus, the splitting distance d of the polarization lights is about 15 microns and the gap between the two waveguides 21 and 22 is set at 15 microns. By properly setting the film thickness of the polarization-light splitting rutile plate in this way, the positional relation of the waveguides can also be determined unifocally.

In the embodiments, a polarization maintain fiber is employed as a fiber on the incidence side in order to make the control of the polarization light easy. A cutout rutile plate forming an inclination angle of about 47.8 degrees with the optical axis is employed as the polarization-light splitting rutile plate. The Futile plate is inserted in such a way that the splitting direction of the polarization light is perpendicular to the titan diffusion depth direction of the wave-guide paths 21 and 22 and the waveguide direction of the light. In addition, the end surfaces of the waveguide path and the polarization-light splitting rutile plates 61 and 62 are stuck to each other by using an adhesive agent with a thickness smaller than 1 micron placed between them which adhesive agent is optically transparent for the wavelength in use.

Next, characteristics with respect to polarization-light splitting in the optical waveguide device provided by the present invention are explained. The polarization-wave quenching ratio is used as an indicator indicating the degree of splitting of a polarization wave. The indicator is a ratio of a TE mode component to a TM mode component. The greater the indicator, the higher the degree of splitting. In the case of adjustment of a polarization wave using a fiber, for example, the polarization-wave quenching ratio is about 20 dB. In the configuration using a ramie pole as disclosed in U.S. Pat. No. 1,351,184, the polarization-wave quenching ratio is in the range 45 to 55 dB. With the method described in reference document 3, a polarization-wave quenching ratio of about 30 dB is verified.

With the polarization-light splitting rutile plate provided by the present invention is adhered in the conventional optical waveguide device, a polarization-wave quenching ratio in the range 65 to 75 dB has been verified. This polarization-wave quenching ratio is much better than that of the conventional optical waveguide device.

Figure 8A:
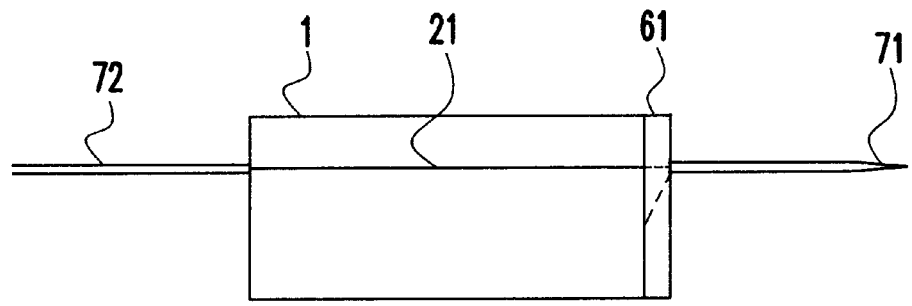
FIGS. 8A to 8B are conceptual diagrams showing techniques to apply and transmit a light to and from a waveguide.
Figure 8B:
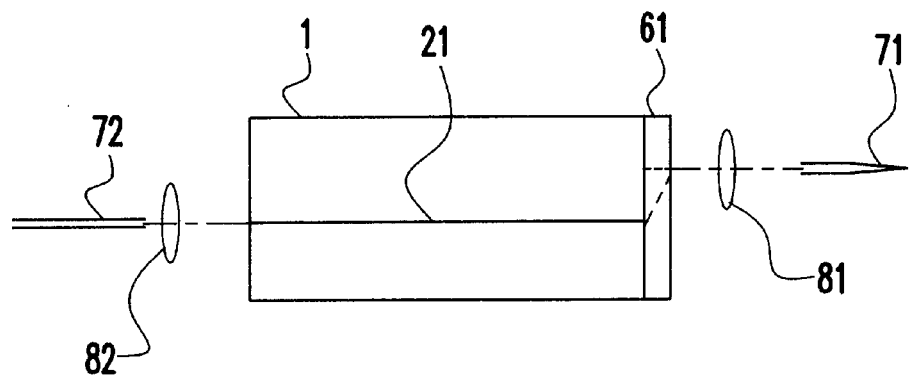

It should be noted that methods for applying an incident light to a waveguide include a bat-joint method wherein fiber ends 71 and 72 are pressed against the polarization-light splitting rutile plates 61 and 62 as shown in FIG. 8A and a lens coupling method wherein lenses 81 and 82 are introduced between the polarization-light splitting rutile plates 61 and 62 and the fiber ends 71 and 72 as shown in FIG. 8B. The bat-joint method has a merit of simple optical-axis adjustment while the lens coupling method has a merit that the amount of loss due to optical coupling between the lenses and the waveguide can be reduced. Since the splitting distance d of the polarization lights increases if the film thickness t of the polarization-light splitting rutile plate is increased, there is also a merit that interference (that is, crosstalk or the polarization-wave quenching ratio) between the polarization lights can be reduced. However, the amount of insertion loss increases. In such a case, the lens coupling method is adopted to reduce the amount of insertion loss.

Next, a Mach-Zehnder light modulating device, an actual device to which the optical waveguide device is applied, is explained.

Figure 9:
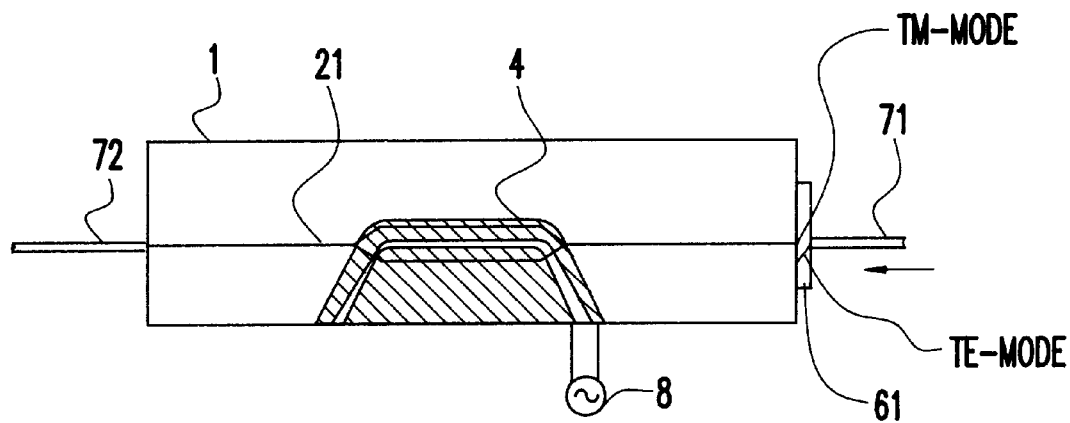
FIG. 9 is a diagram showing the configuration of a Mach-Zehnder light modulating device provided by an embodiment of the present invention.

FIG. 9 is a diagram showing the configuration of a Mach-Zehnder light modulating device provided by the present invention. A niobium-acid lithium substrate of the Z cut Y-axis propagation is employed as a waveguide substrate. A waveguide is created by thermal diffusion of a titanium thin film completing a patterning process. In the case of this embodiment, the width of the waveguide is 7 microns and the gap between the waveguides is 15 microns. The operation length of electrodes created on the waveguides is 40 mm. It should be noted that the electrodes are provided on two split waveguides of the Mach-Zehnder waveguide.

The operation voltage Vπ of the Mach-Zehnder light modulating device is |Vh−Vl|. The operation voltage Vπ is affected by the polarization of an incident light. The following relation holds true:

$$3 \cdot V\pi(TM) \approx V\pi(TE)$$

where Vπ(TM) is the operation voltage in the TM mode while Vπ(TE) is the operation voltage in the TE mode.

Thus, the polarization state of an incident light is put in the TM mode in order to lower the driving voltage. In the configuration described above, Vπ(TM) is about 3 V.

A rutile plate 61 with a film thickness of 15 micron is adhered and fixed to the end surface of the waveguide. Only the TM mode component of a light radiated from an optical fiber 7 is applied to the waveguide by the rutile plate 61. Characteristics of a Mach-Zehnder light modulating device having a similar configuration with no rutile plate have been evaluated for comparison purposes. Evaluation results for both the Mach-Zehnder light modulating devices are shown in Table 1.

By applying the structure of splitting a polarization light of the optical waveguide device provided by the present invention to a light modulating device, the light can be modulated in a state with a high polarization-wave quenching ratio maintained. As a result, in the on and off states of the modulated light, a high polarization-wave quenching ratio can be obtained as well.

As described above, by using the optical waveguide device provided by the present invention, a means for achieving a very simple and compact design with an increased polarization-wave quenching ratio can be provided. It is thus easy to further split polarization lights from an incident light entering a waveguide. By applying the present invention to a device such as an optical modulator, the performance can be enhanced substantially as far as the polarization-wave quenching ratio of the split lights is concerned.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and the scope of the following claims.

What is claimed is:

1. An optical waveguide comprising:
   a waveguide substrate including an optical waveguide having a first end surface;
   an input optical fiber, operatively connected to said first end surface of said optical waveguide, for inputting light into said optical waveguide; and
   a double-refractor, connected between said input optical fiber and said first end surface of said optical waveguide, for splitting said light into a first light and a second light,
   wherein a separation distance between said first light and said second light varies with a thickness of said double-refractor, and
   wherein the thickness of said double-refractor is selected to achieve a desired separation distance, to thereby achieve a desired a polarization-wave quenching ratio, said thickness further being selected so that said polarization-wave quenching ratio lies within a range of between 65 to 75 dB, inclusive.

2. An optical waveguide device according to claim 1, wherein said waveguide substrate comprises niobium-acid lithium.

3. An optical waveguide device according to claim 2, wherein said optical waveguide comprises a titanium thin film thermally diffused on said waveguide substrate.

4. An optical waveguide device according to claim 1, wherein said double-refractor comprises a polarization-light splitting film.

5. An optical waveguide device according to claim 4, wherein said polarization-light splitting film comprises a rutile material.

6. An optical waveguide device according to claim 1, wherein said optical waveguide includes an electrode and when a voltage is applied to said electrode, said optical waveguide varies a light output.

7. An optical waveguide device as in claim 1, wherein said input optical fiber is positioned such that only a light component having an electric-field direction parallel to said waveguide substrate is input to said optical waveguide.

8. An optical waveguide device as in claim 1, wherein said input optical fiber is positioned such that only a light component having a magnetic-field direction parallel to said waveguide substrate is input to said optical waveguide.

9. An optical waveguide device as in claim 1, wherein only said first light is directed to said optical waveguide.

10. An optical waveguide device as in claim 1, wherein said separation distance is approximately equal to one-tenth the thickness of said double-refractor.

11. An optical waveguide device as in claim 10, wherein the thickness of said double refractor is 150 microns and said separation distance is 15 microns.

12. An optical waveguide device as in claim 1, wherein said double-refractor forms an inclination angle of about 47.8 degrees with an optical axis of said optical waveguide.

13. An optical device comprising:
a waveguide substrate including at least one optical waveguide, each of said at least one optical waveguide having a first end surface;
an input optical fiber, operatively connected to said first end surface of each of said at least one optical waveguide, for inputting light into said at least one optical waveguide; and
a first double-refractor, connected between said input optical fiber and said first end surface of said at least one optical waveguide, for splitting said light into a first light and a second light,
wherein a separation distance between said first light and said second light varies with a thickness of said first double-refractor, and
wherein the thickness of said first double-refractor is selected to achieve a desired separation distance, to thereby achieve a desired a polarization-wave quenching ratio, said thickness further being selected so that said polarization-wave quenching ratio lies within a range of between 65 to 75 dB, inclusive.

14. An optical device as in claim 13, wherein said at least one optical waveguide comprises a first optical waveguide and a second optical waveguide.

15. An optical device as in claim 14, further comprising a first output optical fiber connected to said first optical waveguide, and a second output optical fiber connected to said second optical waveguide.

16. An optical device as in claim 14, wherein each of said at least one optical waveguide includes a second end surface and said optical device further comprises:
a second double-refractor connected to said second end surface; and
an output optical fiber connected to said second double-refractor.

17. An optical device as in claim 14, wherein said first light is directed to said first optical waveguide and said second light is directed to said second optical waveguide.

18. An optical device according to claim 13, wherein said waveguide substrate comprises niobium-acid lithium and said at least one optical waveguide comprises a titanium thin film thermally diffused on said waveguide substrate.

19. An optical device according to claim 13, wherein said double-refractor comprises a polarization-light splitting film comprising a rutile material.

20. An optical device according to claim 13, wherein each of said at least one optical waveguide includes an electrode and when a voltage is applied to said electrode, said at least one optical waveguide varies a light output.

21. An optical device as in claim 13, wherein said input optical fiber is positioned such that only a light component having an electric-field direction parallel to said waveguide substrate is input to said at least one optical waveguide.

22. An optical device as in claim 13, wherein said input optical fiber is positioned such that only a light component having a magnetic-field direction parallel to said waveguide substrate is input to said at least one optical waveguide.

23. An optical device as in claim 14, wherein said input optical fiber is positioned such that only a light component having a magnetic-field direction parallel to said waveguide substrate is input to said first optical waveguide and only a light component having a magnetic-field direction parallel to said waveguide substrate is input to said second optical waveguide.

24. An optical waveguide device as in claim 13, wherein said separation distance is approximately equal to one-tenth the thickness of said first double-refractor.

25. An optical waveguide device as in claim 24, wherein the thickness of said first double refractor is 150 microns and said separation distance is 15 microns.

26. An optical waveguide device as in claim 13, wherein said first double-refractor forms an inclination angle of about 47.8 degrees with an optical axis of said optical waveguide.

* * * * *